US007177251B2

(12) United States Patent
Kawashima et al.

(10) Patent No.: US 7,177,251 B2
(45) Date of Patent: Feb. 13, 2007

(54) RECORDING METHOD, RECORDING APPARATUS, REPRODUCTION METHOD AND REPRODUCTION APPARATUS FOR RECORDING AND REPRODUCING DATA IN WHICH ADDITIONAL INFORMATION IS BURIED IN CONTENTS DATA

(75) Inventors: Tetsuji Kawashima, Tokyo (JP); Yukio Shishido, Tokyo (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 10/296,950

(22) PCT Filed: Apr. 12, 2002

(86) PCT No.: PCT/JP02/03672

§ 371 (c)(1),
(2), (4) Date: Aug. 13, 2003

(87) PCT Pub. No.: WO02/086886

PCT Pub. Date: Oct. 31, 2002

(65) Prior Publication Data

US 2004/0027979 A1 Feb. 12, 2004

(30) Foreign Application Priority Data

Apr. 16, 2001 (JP) .............................. 2001-117105

(51) Int. Cl.
*G11B 7/00* (2006.01)

(52) U.S. Cl. .................................................. 369/47.33

(58) Field of Classification Search .............. 369/47.33
See application file for complete search history.

(56) References Cited

U.S. PATENT DOCUMENTS

| 5,649,054 A * | 7/1997 | Oomen et al. ............... 704/229 |
| 6,526,510 B1 * | 2/2003 | Kori et al. ................... 713/176 |
| 6,578,149 B1 * | 6/2003 | Kawamae et al. ............ 726/26 |
| 6,728,379 B1 * | 4/2004 | Ishibashi et al. ............ 380/278 |
| 6,990,584 B1 * | 1/2006 | Yoshiura et al. ............ 713/176 |

FOREIGN PATENT DOCUMENTS

| JP | 6-131855 | 5/1994 |
| JP | 7-93877 | 4/1995 |
| JP | 9-128879 | 5/1997 |
| JP | 2000-113569 | 4/2000 |
| JP | 2000-163871 | 6/2000 |
| JP | 2001-6344 | 1/2001 |

* cited by examiner

*Primary Examiner*—Gautam R. Patel
(74) *Attorney, Agent, or Firm*—Oblon, Spivak, McClelland, Maier & Neustadt, P.C.

(57) ABSTRACT

The present invention aims to enable revision of additional information buried in contents data with less burden on hardware. For this purpose, a predetermined amount of inputted contents data is temporarily stored in buffer means, the additional information buried in the contents data being detected from the contents data temporarily stored in the buffer means, the contents of the detected additional information being estimated, the contents data being made to be recorded in a predetermined medium when estimated that the contents data can be recorded, and the contents data being made not to be recorded in the medium when estimated that the contents data must not be recorded. In addition, when estimated that revision of the additional information is necessary, the relevant part of data stored in the buffer means is revised while it is being stored in the buffer means.

16 Claims, 6 Drawing Sheets

RECORDING METHOD, RECORDING APPARATUS, REPRODUCTION METHOD AND REPRODUCTION APPARATUS FOR RECORDING AND REPRODUCING DATA IN WHICH ADDITIONAL INFORMATION IS BURIED IN CONTENTS DATA

TECHNICAL FIELD

The present invention relates to a recording method and a recording apparatus fit for recording data in which additional information such as copyright management information is buried in contents data such as digital audio data, and also relates to a reproducing method and a reproducing apparatus fit for reproducing the same data.

BACKGROUND ART

It has heretofore been put into practice to bury copyright management information in contents data such as digital audio data. For example, in case of digital audio data, it has been proposed to bury so-called "Buried-data" in the audio data for executing the copyright management.

Details about the buried-data will be explained later when describing the embodiment. In short, the additional information other than the contents data is arranged by making use of several bits, each of which belongs to each sector and is the least significant bit of digital data whose one sample includes, e.g. sixteen bits. To make output sound when audio data including the buried-data are reproduced remain the same as output sound when the audio data not yet including the buried-data are reproduced, some modifications are usually made on audio data in sections other than those including the buried data. In addition, it is designed that the buried-data is not arranged in sections where audio data are mute data.

By burying the buried-data having the copyright management information in the contents data such as audio data, satisfactory management of copyright of those contents can be performed using the buried-data. Because the buried-data buried in the contents data will remain as it is, unless compression processing or the like is performed on the contents data. Thus, as compared with a case where copyright management information is added as additional information like subcode which is different from audio data itself, it is difficult to alter or remove the copyright management information, so that the management of copyright can be carried out effectively.

Incidentally, when the management of copyright on audio data, etc. is carried out, there are cases where the modifications of copyright information are required depending on use conditions of its contents. However, when the buried-data is used, hardware within apparatus must bear a heavy burden to execute processings for the modification. This poses a problem.

Specifically, the copyright information in contents data such as audio data may include information on limiting the number of times of copying. For example, there may be a case where copying of contents is permitted only once. On such occasion, when reproducing original data and then recording the reproduced data in some medium, it is necessary to revise old buried-data, which is contained in the reproduced original data and indicates that copying is allowed once, to new buried-data indicating that no copying is allowed, before recording it in the medium. To execute such revision processing, however, it is necessary to extract the buried-data from the contents data, revise the buried-data that is extracted, and bury the buried-data that is revised in the contents data. Because the buried-data is primarily recorded for preventing a wrong use, it is designed to make the processing difficult. When some circuit for the processing is provided in a data recording apparatus or the like, the structure of apparatus goes complicated accordingly. This poses the aforesaid problem.

Additionally, although the problem has been described, which is posed when the buried-data is buried in audio data for use, the same problem will also be raised when processing additional information which is buried in other various contents data.

DISCLOSURE OF INVENTION

An object of the present invention is to enable the revision of additional information buried in contents data with less burden on the hardware.

A first invention is a recording method comprising:

a storage step of temporarily storing a predetermined amount of inputted contents data in buffer means;

a detection step of detecting the additional information buried in the contents data from the contents data that is temporarily stored at the storage step;

an estimation step of estimating contents of the additional information that is detected at the detection step; and a record step of recording the contents data in a predetermined medium when estimated that the contents data can be recorded at the estimation step, and not recording the contents data in the medium when estimated that the contents data must not be recorded.

By arranging in this way, when information on copy-limiting is contained in the additional information buried in the inputted contents data for example, the recording of the contents data in the medium is restricted based on the additional information. By estimating data stored in the buffer means which temporarily stores data to be recorded, a satisfactory record-restriction processing will be enabled. Thus, a copyright protection processing such as the prevention of wrong copying can easily be executed.

A second invention is a recording method according to the first invention, further comprising a rewrite step of rewriting additional information stored in the buffer means while the additional information is being stored, when estimated that the rewriting of the additional information is necessary at the estimation step.

By arranging in this manner, it will be possible to rewrite easily the additional information such as the copy-limiting information without needing special means to perform the rewriting of additional information.

A third invention is a recording method according to the first invention, further comprising a kind identification step of identifying the kind of data on the inputted contents data, wherein only when the contents data are identified as a predetermined format of data at the kind identification step, the aforesaid detection step and estimation step are carried out so as to restrict recording the data in a medium.

By doing in this way, only when recording a format of data whose recording may likely be restricted, the relevant detection and estimation processings need to be executed. When recording another format of data, the detection and estimation of additional information need not to be executed. This can make the execution of record processing easier accordingly.

A fourth invention is a recording method according to the third invention, wherein the predetermined format to be identified at the kind identification step is a format which may probably be audio data.

By doing in this way, the preventive processing against wrong recording of audio data will effectively function by simple processing.

A fifth invention is a recording method according to the first invention, wherein when the contents data begin to be inputted, if the contents data stored in the buffer means at the storage step reach the predetermined amount of data or more, the detecting operation at the detection step is started.

By arranging in this manner, the additional information buried periodically in the contents data will certainly be detected. Further, when the additional information is not buried in a front section of the contents data, the additional information will also be detected certainly.

A sixth invention is a recording apparatus comprising:

buffer means for temporarily storing a predetermined amount of inputted contents data;

control means for detecting additional information buried in the contents data from the contents data that are temporarily stored in the buffer means, for making the contents data to be recorded if contents of the detected additional information indicate that the contents data can be recorded, and for making contents data not to be recorded if contents of the detected additional information indicate that the contents data must not be recorded; and recorder means for recording in a predetermined medium under the control of the control means.

By constructing in this way, when the additional information buried in inputted contents data contains copy-limiting information for example, processing to restrict recording the contents data in a medium is executed based on the additional information. The processing to restrict recording the contents data will be executed satisfactorily by estimating data to be recorded, which are temporarily stored in the buffer means. As a result, there can be provided a recording apparatus which is capable of performing easily a copyright protection processing such as the prevention against wrong copying.

A seventh invention is a recording apparatus according to the sixth invention, wherein when the control means estimates that the rewriting of additional information is necessary, the control means controls to rewrite the additional information stored in the buffer means, while the relevant additional information is being stored in the buffer means.

By constructing in this manner, it is possible to rewrite the additional information such as copy-limiting information easily without needing any special means to perform the rewriting of additional information.

A eighth invention is a recording apparatus according to the sixth invention, wherein the control means identifies the kind of data on the contents data temporarily stored in the buffer means, and controls to record the contents data in the medium, only when the contents data are identified as a predetermined format of data.

By constructing in this way, only when recording a format of data whose recoding may likely be restricted, the relevant detection and estimation processings need to be executed. When recording another format of data, the detection and estimation of additional information need not to be executed. This can make the execution of record processing easier accordingly.

A ninth invention is a recording apparatus according to the sixth invention, wherein after the amount of data stored in the buffer means reaches a predetermined amount of data or over, the control means starts to detect the additional information.

By constructing in this manner, the additional information buried periodically in contents data can be detected certainly. When the additional information is not buried in a front section of the contents data, the additional information can also be detected certainly.

A tenth invention is a reproducing method comprising:

a storage step of temporarily storing a predetermined amount of contents data reproduced from a predetermined medium in buffer means;

a detection step of detecting additional information buried in the contents data from the contents data temporarily stored at the storage step;

an estimation step of estimating contents of the additional information detected at the detection step; and an output step of outputting outside the contents data temporarily stored in the buffer means when estimated that the contents data can be copied at the estimation step, and not outputting outside the contents data temporarily stored in the buffer means when estimated that the contents data must not be copied.

By doing in this way, for example, when the additional information buried in the contents data reproduced from the medium includes copy-limiting information, the outputting of contents data is restricted based on the additional information. In other words, it is restricted that the outputted contents data are recorded in another medium. Thus, an output restriction processing on the reproduced data will be executed satisfactorily by estimating the data stored in the buffer means that temporarily stores the reproduced data. This means that a copyright protection processing such as the preventive processing against wrong copying that records the reproduced data in other recording device can be executed with ease.

An eleventh invention is a reproducing method according to the tenth invention, further comprising a rewrite step of rewriting the additional information stored in the buffer means while the additional information is being stored, when estimated that the rewriting of the additional information is necessary at the estimation step.

By arranging in this manner, it will be possible to rewrite easily the additional information such as copy-limiting information without the necessity of providing special means to perform the rewriting of additional information.

A twelfth invention is a reproducing method, further comprising a kind identification step of identifying the kind of data on the contents data stored at the storage step, wherein only when the contents data is identified as a predetermined format of data at the kind identification step, the aforesaid detection step and estimation step are carried out so as to restrict outputting the reproduced data.

By arranging in this manner, only when reproducing a format of data whose outputting may likely be restricted against wrong use, the relevant detection and estimation processings need to be executed. When reproducing another format of data, the detection and estimation of additional information need not to be executed, whereby the reproduction processing can more easily be executed accordingly.

A thirteenth invention is a reproducing method according to the twelfth invention, wherein the predetermined format to be identified at the kind identification step is a format indicative of audio data.

By doing in this way, the preventive processing against wrong use of audio data will effectively function by simple processing.

A fourteenth invention is a reproducing method according to the twelfth invention, wherein when the contents data begin to be reproduced, if the contents data stored in the buffer means at the storage step reach a predetermined amount of data or over, the detection at the detection step is started.

By arranging in this manner, it will be possible to certainly detect the additional information buried periodically in the contents data. Further, when the additional information is not buried in a front section of the contents data, the additional information can also be detected certainly.

A fifteenth invention is a reproducing method according to the twelfth invention, further comprising an indication step of indicating a result estimated at the estimation step in a predetermined manner.

By arranging in this way, when outputting of data reproduced from the medium is restricted, it will be clear by the indication why the outputting is restricted.

A sixteenth invention is a reproducing apparatus comprising:

reproduction means for reproducing contents data from a predetermined medium;

buffer means for temporarily storing a predetermined amount of the contents data reproduced by the reproduction means;

output means for making the contents data temporarily stored in the buffer means to be outputted; and control means for detecting additional information buried in the contents data from the contents data temporarily stored in the buffer means, making the contents data to be outputted from the output means if the detected additional information indicates that the contents data can be copied, and making the contents data not to be outputted from the output means if it indicates that the contents data must not be copied.

By constructing in this way, for example, when the additional information buried in the contents data reproduced from the medium contains copy-limiting information, outputting of the contents data is restricted based on the additional information, so that it is restricted that the outputted contents data are recorded in another medium. Thus, by estimating data stored in the buffer means that temporarily stores the reproduced data, the output restriction processing of the reproduced data will be executed satisfactorily. In consequence, there can be obtained a reproducing apparatus in which copyright protection processing such as the prevention of wrong copying that records the reproduced data in other recording device can be executed with ease.

A seventeenth invention is a reproducing apparatus according to the sixteenth invention, wherein when the control means estimates that the rewriting of additional information of contents data outputted from the output means is necessary, the control means controls to rewrite the additional information stored in the buffer means, while the relevant additional information is being stored in the buffer means.

By constructing in this way, it is possible to rewrite the additional information such as copy-limiting information simply without needing any special means to perform the rewriting of additional information.

An eighteenth invention is a reproducing apparatus according to the sixteenth invention, wherein the control means identifies the kind of data on the contents data temporarily stored in the buffer means and controls to make the contents data not to be outputted from the output means only when the contents data are identified as data of a predetermined format.

By constructing in this manner, only when reproducing a format of data which may likely be restricted against wrong use, the relevant detection and estimation processings need to be executed. When reproducing the other format of data, there is no need to execute the detection and estimation of additional information, so that it will be possible to carry out more simply the reproduction processing accordingly.

A nineteenth invention is a reproducing apparatus according to the sixteenth invention, wherein after the amount of data stored in the buffer means reaches a predetermined amount of data or over, the control means starts to detect the additional information.

By constructing in this way, it will be possible to certainly detect the additional information buried periodically in the contents data. Further, when the additional information is not buried in a front section of the contents data, it will also be possible to certainly detect the additional information.

A twentieth invention is a reproducing apparatus according to the sixteenth invention, further comprising an indication means for indicating contents instructed by the additional information detected by the control means.

By constructing in this manner, when the outputting of data reproduced from the medium is restricted, it will be clear by the indication why the outputting is restricted.

BEST MODE FOR CARRYING OUT THE INVENTION

An embodiment of the present invention will be described below with reference to the accompanying drawings.

Figure 1:
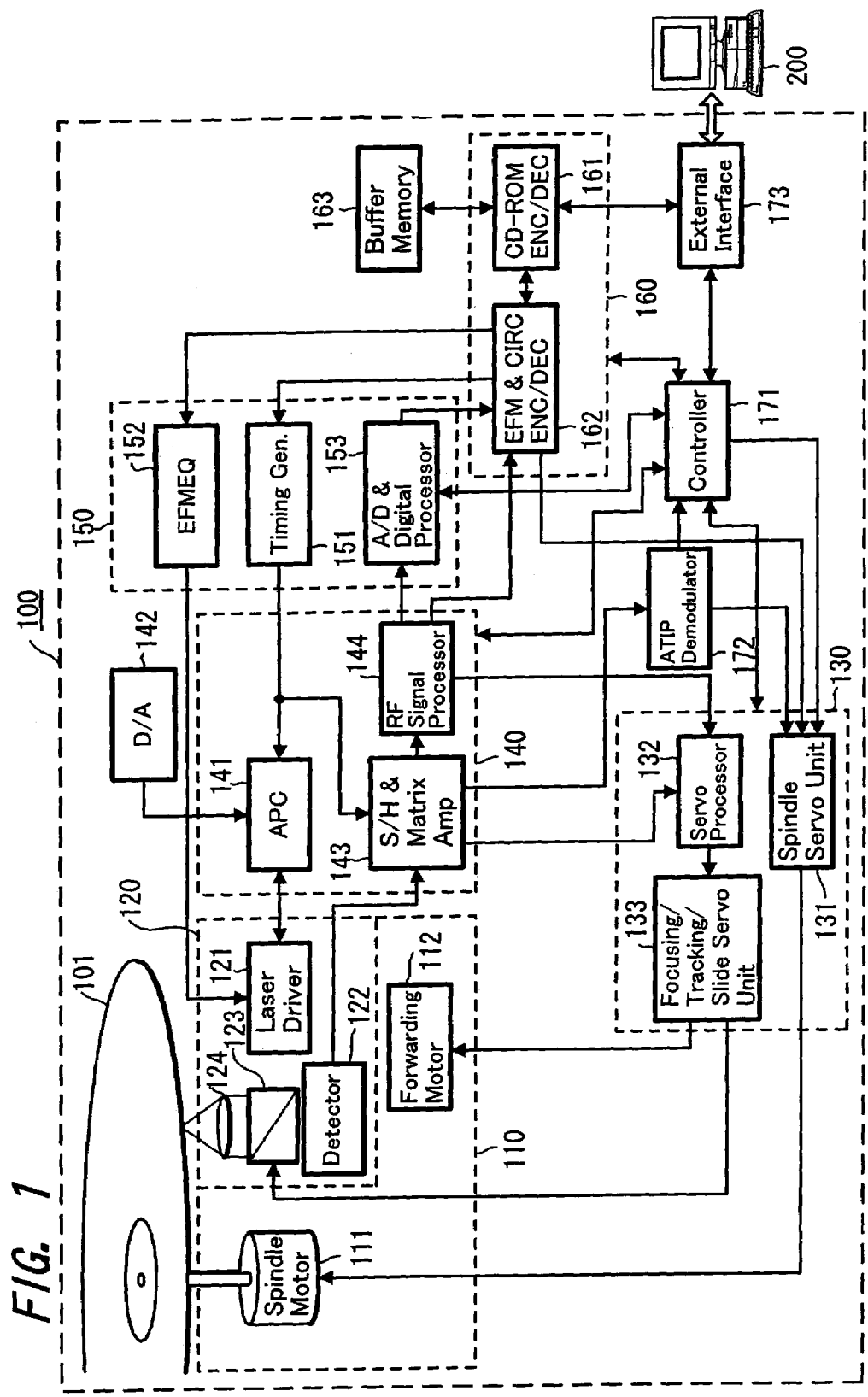
FIG. 1 is a block diagram showing the entire structure of an apparatus according to an embodiment of the present invention.

FIG. 1 shows the structure of a disk-drive apparatus 100 in which processings according to the present invention are executed. The disk-drive apparatus 100 can reproduce data from a data-recorded disk called "CD-ROM" and can record data using a recordable medium called "CD-R" or "CD-RW" (CD-R is a medium in which data can be recorded only once; CD-RW is a medium in which data can be rewritten.). The apparatus 100 outputs the reproduced data to some connected equipment (such as computer device) and records data inputted from the connected equipment.

In case of the present example, the disk-drive apparatus 100 is connected to a host computer 200. The reproduced data are supplied to the host computer 200 and processed there. Data to be recorded are also supplied from the host computer 200. The reproduction and recording are carried out based on instructions from the host computer 200.

Describing the internal structure of the disk-drive apparatus 100, a disk 101 mounted on the drive apparatus 100 is driven to rotate by a spindle motor 111 mounted on a base unit 110. Laser beams are applied to a signal-recording surface of the disk 101 from a laser driver 121 within an optical pickup 120 through a beam splitter 123 and lens 124. When data are recorded on the disk 101, power of the applied laser beams is set at a relatively strong power for recording use. When data recorded on the disk 101 are read out, the power of laser beams applied to the disk is set at a relatively weak power for reproduction use. Return beams reflected at the signal-recorded surface of disk 101 arrive at a detector 122 and are detected therein. Additionally, the detector 122 is designed to detect the beams by dividing them into plural positions. A radial position of the optical pickup 120 relative to the disk 101 is determined by driving a forwarding motor (sled motor) 112 mounted on a base unit 110. The optical pickup 120 includes a focusing coil or a tracking coil (not shown) for making focalization or tracking adjustment of laser beams. Those coils are controlled by a focusing control signal or a tracking control signal supplied from a focusing/tracking/slide servo unit 133 within a servo block 130. The forwarding motor 112 is also driven and controlled by a slide-motor-drive signal from the focusing/tracking/slide servo unit 133. The spindle motor 111 is driven and controlled by a spindle-drive signal from a spindle servo unit 131 within the servo block 130.

The signal detected by the detector 122 within the optical pickup 120 is supplied to a sample/hold and matrix amp circuit 143 within a RF processing block 140, where the detected signal is sampled with predetermined timing and amplified. The resulting signal is supplied to a RF signal processor circuit 144 which produces a reproduced RF signal. A sampling rate at the circuit 143 depends on a sampling pulse supplied from a timing generator 151 within a digital processor block 150. The sample/hold and matrix amp circuit 143 executes operational processings of addition, subtraction, etc. of outputs from the detector 122 at predetermined positions to form error components such as a tracking error signal and focusing error signal. The error components are supplied to a servo processor 132 within the servo block 130 and then a servo control signal is produced by the servo unit 133.

The reproduced RF signal outputted by the RF signal processor circuit 144 is supplied to an analog/digital converter and digital processor circuit 153 within the digital processing block 150. The circuit 153 converts the signal into the digital form and processes the digital data. The processed data are supplied to a decode/encode block 160 which decodes the data for reproduction to generate reproduced data. The decode/encode block 160 includes a CD-ROM encoder/decoder 161 and an EFM & CIRC encoder/decoder 162. The EFM & CIRC encoder/decoder 162 performs, in reproduction, decoding for EFM (Eight-to-Fourteen Modulation) prescribed by CD format, correction processing using CIRC (Cross Interleave Reed-Solomon Code) and the like. The CD-ROM encoder/decoder 161 decodes from CD-ROM format.

On this occasion, a buffer memory 163 for storing data temporarily is connected to the decode/encode block 160. The buffer memory 163 can temporarily store undecoded data or decoded data up to a storage capacity of the buffer memory. The amount of data that the buffer memory 163 can store is set at a comparatively large amount of data. For example, in case of audio data, the storage capacity of the buffer memory is set so that it can store audio data at least for several decade seconds. Additionally, it is arranged in this embodiment that part of data stored in the buffer memory 163 can be revised (rewritten) under the control of a controller 171 described later. The rewrite processing executed using the buffer memory 163 will be described later.

The reproduced data decoded by the decode/encode block 160 are outputted outside through an external interface 173. In this embodiment, the data are transmitted to the host computer 200 connected to the disk-drive apparatus 100.

When data are recorded on the disk by the disk-drive apparatus 100, data inputted, for example, from the host computer 200 to the external interface 173 are encoded into CD-ROM format by the CD-ROM encoder/decoder 161 within the decode/encode block 160. The EFM & CIRC encoder/decoder 162 performs encoding for EFM (Eight-to-Fourteen Modulation) prescribed by CD format, additional processing of CIRC (Cross Interleave Reed-Solomon Code) and the like.

The data to be recorded, which are encoded by the decode/encode block 160, so-called EFM data are supplied to an EFM equalizer 152 within the digital processing block 150. The EFM equalizer 152 performs an equalization processing on the data for operating the laser driver 121. A laser output of the laser driver 121 within the optical pickup 120 is controlled based on the equalized data to be recorded. The timing generator 151 within the digital processing block 150 generates a timing pulse in synchronism with the process timing of the decode/encode block 160. The generated timing pulse is supplied to an automatic power control (APC) circuit 141 which controls timing of level control of a laser-drive signal supplied from a digital/analog converter 142. The laser-drive signal adjusted in level by the APC circuit 141 is supplied to the laser driver 121 and data are recorded on the signal-recording surface of the disk 101 by laser beams applied to the disk 101.

In addition, when the mounted disk 101 has address information, etc. recorded on the track as "track wobbling", an ATIP demodulator 172 which receives an output of the sample/hold and matrix amp circuit 143 demodulates the data recorded by the wobbling and then supplies that data to the controller 171. The data demodulated by the ATIP demodulator 172 are also supplied to the servo block 130 for use of servo control.

The processings in each circuit for reproduction and recording which have been described so far are executed under the control of the controller 171. As to processing of the buried-data described later, it is arranged that the controller estimates the data processed in each block to execute an appropriate control processing based on the buried-data.

Next, processing operations when recording data on a disk or reproducing data recorded on the disk using the disk-drive apparatus 100 of this embodiment will be described. The description is herein centered on processing associated with the buried-data contained in the data.

First of all, it will be described what kind of data the buried-data is: As already described in the background art column, it has heretofore been put into practice to bury copyright management information in various contents data such as digital audio data. In case of digital audio data, it has been proposed to bury the buried-data in actual audio data for executing the copyright management. General record processing of copyright management information, which has been practiced from the past, is such that the data are recorded using subcode, etc. incident to the contents data (audio data), whereas the buried-data is directly buried in part of real audio data as copyright management information and the like. Thus, the buried-data will remain as it is, unless compression processing or the like is performed on the data, so that the buried-data will effectively function as the copyright management information. Moreover, it is designed to select section, etc. in which the buried-data is to be buried so that the existence of the buried-data may make no substantial effect on reproduced sound when audio data having the buried-data are reproduced.

Figure 2:
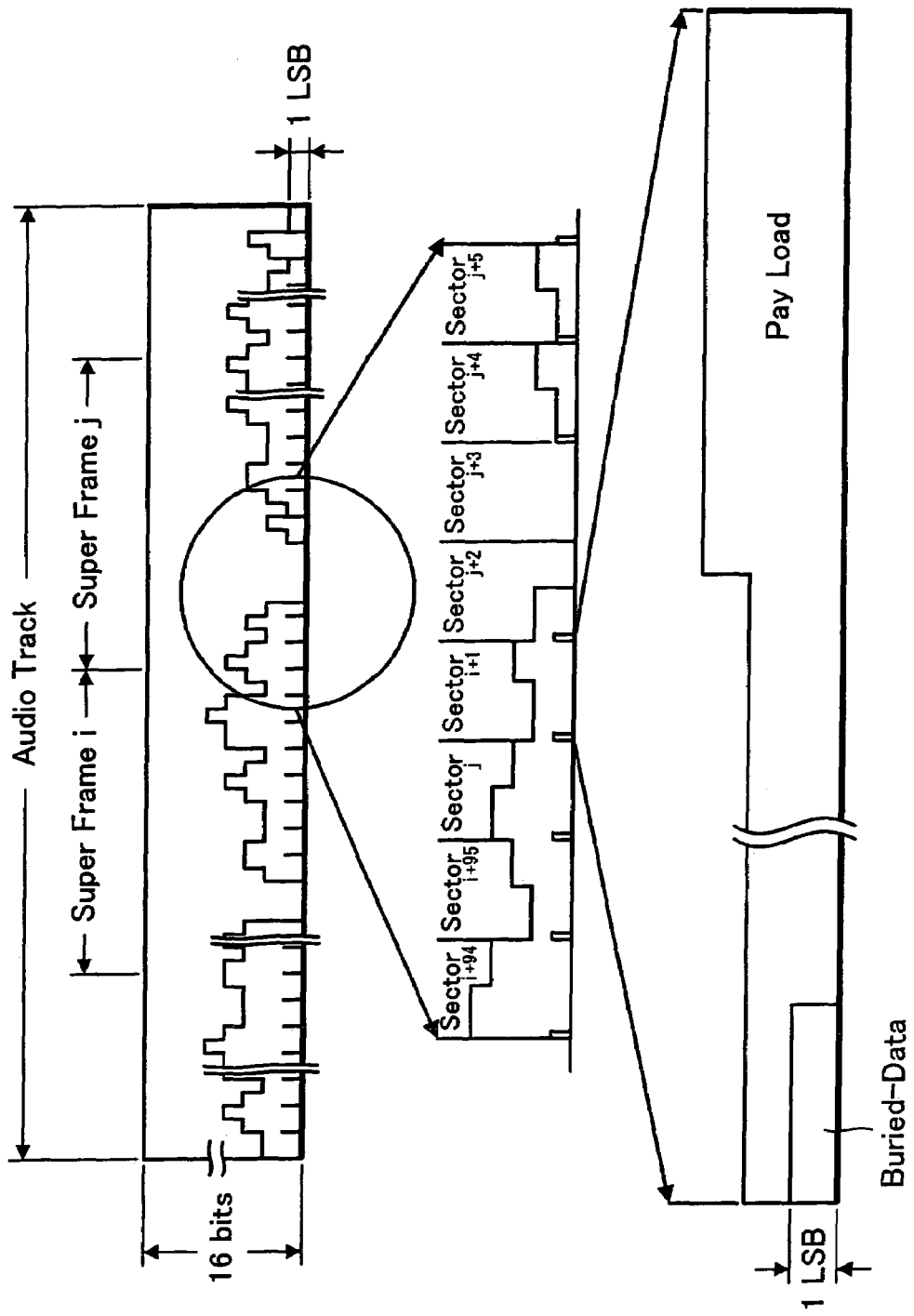
FIG. 2 is an explanatory diagram showing the buried-data arrangement according to an embodiment of the present invention.

FIG. 2 is a diagram showing an arrangement example of the buried-data. An upper part of FIG. 2 shows the structure of audio data. In this figure, digital audio data are comprised of samples each of which includes sixteen bits. The data of samples each having sixteen bits for a predetermined period of time are collected into one super frame. In the upper part of FIG. 2, there are shown a super frame i and a super frame j subsequent to the super frame i. Each sample data of sixteen bits shows a sample value of a waveform corresponding to transmitted audio signal. One super frame is divided into ninety-six sectors, as is shown in a middle part of FIG. 2. A lower part of FIG. 2 shows an enlarged example of data in one sector. The buried-data is assigned or distributed to the least significant bits (LSB) of a predetermined number of sample data from the head of each sector. However, as in case of sector [j+3] shown in FIG. 2, when a sector has audio data which are mute (or nearly mute) in level, when a null least significant bit continues in that sector for example, no buried-data shall be distributed to that sector. Moreover, when distributing the buried-data to each sector, audio data may be revised to some extent so that reproduced audio data may not alter from the original audio owing to the buried-data distribution. The buried-data in this example, however, uses only part of the least significant bits in each sector and so almost no change will occur in the reproduced sound without performing the audio data revision.

Figure 3:
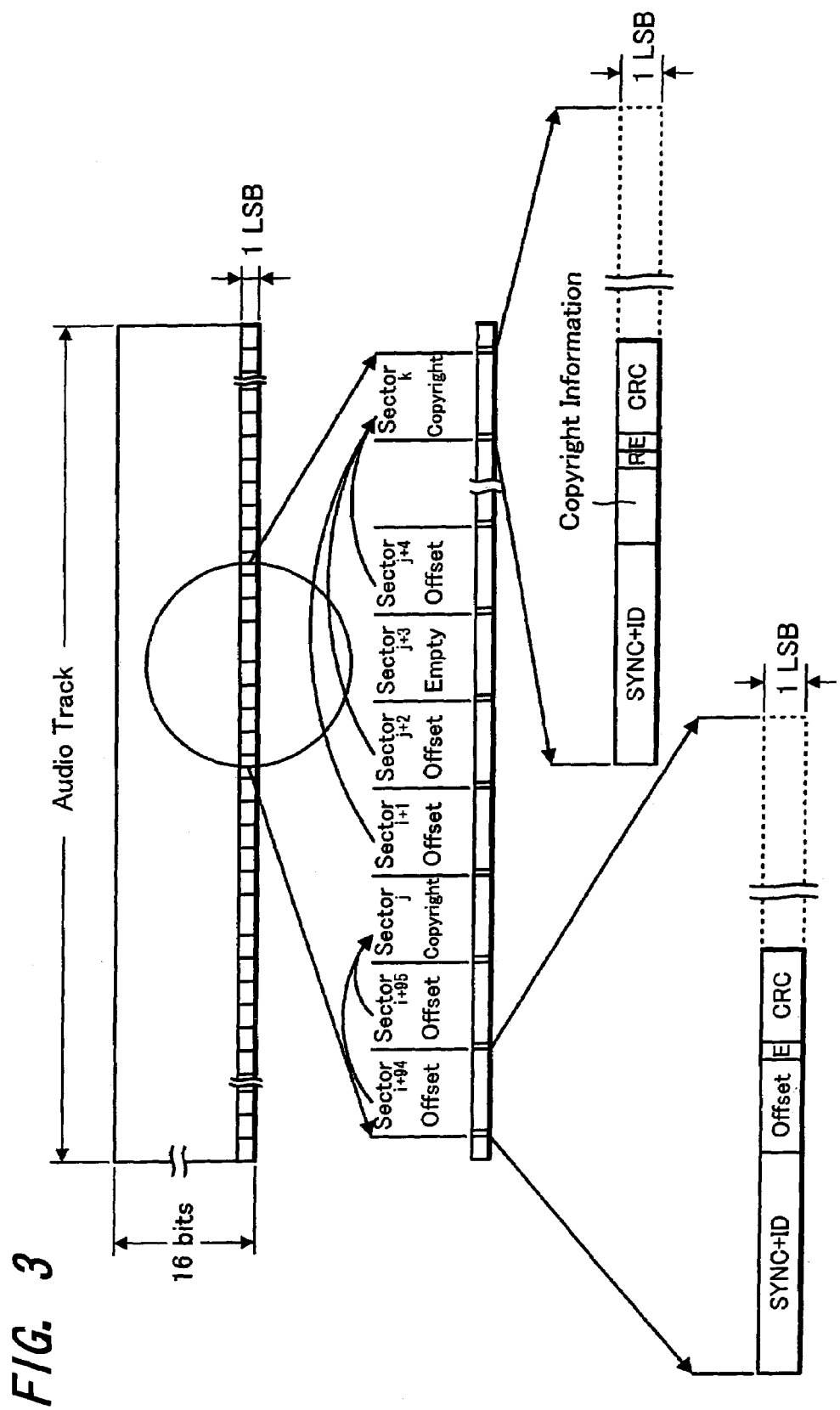
FIG. 3 is an explanatory diagram showing copyright information arrangement according to an embodiment of the present invention.

FIG. 3 shows the structure of buried-data in more detail. The buried-data is distributed to the least significant bits in each sector of audio data track having sixteen bits per sample, shown in an upper part of FIG. 3. The buried-data may include offset data or may include copyright information. Further, a mute section like the sector [j+3] has no buried-data (empty).

The copyright information is assigned to only one sector in one superframe. To other sectors within one superframe are basically assigned the offset data as the buried-data. The offset data indicate the number of sectors up to the position of a sector where the next copyright information is assigned. Therefore, if the offset data can be detected at least once during one superframe period of time, it is possible to measure the position where the copyright information is assigned, so that the copyright information can be detected without fail.

As shown in a lower part of FIG. 3, the buried-data including the offset data also includes beside the offset data a synchronizing word, a cyclic redundancy code (CRC) being error detection code and so forth.

As shown in a lower part of FIG. 3, the buried-data including the copyright information also includes a synchronization word, an extension tag of one bit, CRC and so forth beside the copyright information being the copyright management information. The cyclic redundancy code is provided for all data in each buried-data.

Figure 4:
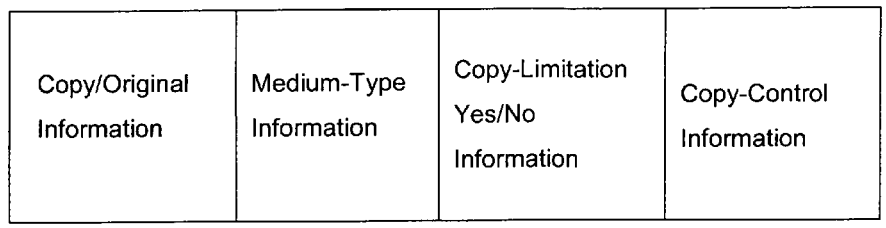
FIG. 4 is an explanatory diagram showing copyright information according to an embodiment of the present invention.

FIG. 4 shows a structure example of the copyright information which is assigned to one buried-data. In this example, there are included four kinds of information, i.e. copy/original information, medium-type information, copy-limitation yes/no information, and copy-control information. The copy/original information indicates whether or not audio data including the buried-data is original data or copied data from some medium and the like. The medium-type information indicates the type of a medium in which audio data including the buried-data is recorded. The copy-limitation yes/no information indicates whether or not there is any limitation on copying audio data in which the buried-data is buried. The copy-control information indicates the number of times that audio data including the buried-data can be copied (the number of times that the audio data can be recorded in a medium).

The copy-control information indicates, for example, that copying can be made null time (namely, copying is inhibited.) or that copying can be made only once or that copying can be made unlimitedly or the like.

When the disk-drive apparatus 100 of this embodiment records data inputted from the host computer 200 on the disk 101, the controller 171 controls to store data to be recorded in the buffer memory 163 and to estimate the buried-data constructed as described above from the stored data. Therefore, it can be decided whether the recording is permitted or not. Moreover, the buried-data can be revised if necessary.

In addition, the data which are handled by the disk-drive apparatus 100 of this embodiment (namely, data which are recorded and reproduced) may include audio data in which no buried-data is buried other than the audio data in which the buried data is buried. Basically, no buried-data is buried in data other than audio data. It is possible, however, to bury the buried-data (or other similar data for copyright management) in various contents data other than audio data such as video data.

Furthermore, the buried-data is basically buried in almost all section from the head of audio data through to the end thereof. However, for example, the buried-data may be arranged only in partial section of a musical piece in such processing that the part is replaced by the other audio data due to partial edit processing.

Figure 5:
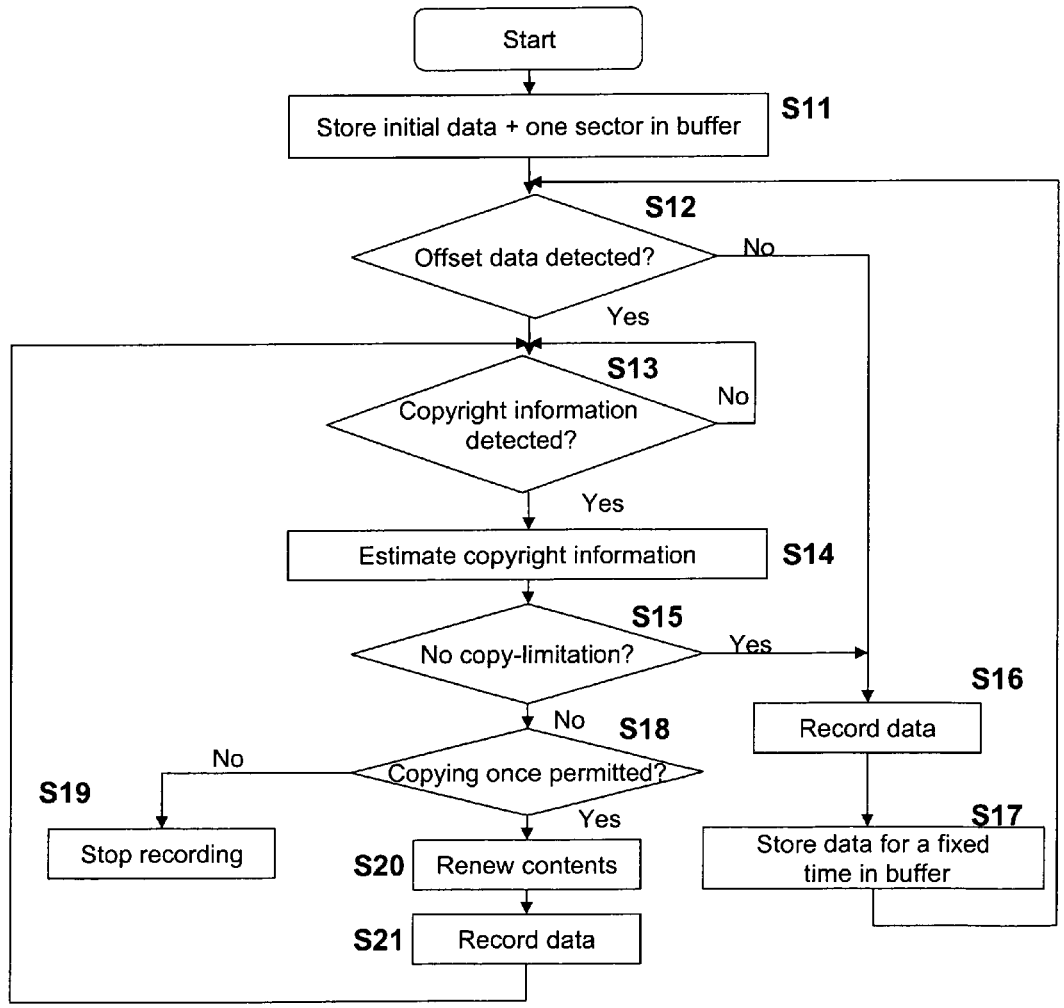
FIG. 5 is a flow chart showing the record processing according to an embodiment of the present invention.

Next, record processing by the disk-drive apparatus 100 of this embodiment will be described with processing of the buried-data being centered. A flow chart of FIG. 5 shows an example of processing associated with copyright information in recording executed under the control of the controller 171. The processing will be described below. When data are first inputted from the host computer 200 through the external interface 173, the inputted data are stored in the buffer memory 163 by the amount of data which is equal to the amount of data corresponding to one sector plus the amount of data corresponding to initial data (step S11).

In this case, the amount of data corresponding to initial data is determined to be the amount of data, for example, which the buffer memory 163 can store with comparative allowance and which corresponds to audio data at least for ten and several seconds. The reason why the initial data are stored is as follows. In general, audio data have a mute section in the front and as already described, no buried-data is arranged in the mute section. Therefore, it takes a certain time to reach the buried-data from the front of audio data.

When the predetermined amount of inputted data has been stored in the buffer memory 163, the controller 171 detects the data stored in the buffer memory 163 and estimates whether or not the offset data can be detected from the stored data (step S12).

At this moment, the amount of inputted data is first estimated from the subcode or the like incidental to the inputted data as to whether or not the format is indicative of the possibility of audio data including the buried-data. When it is estimated that there are inputted data of format indicative of no possibility of audio data having the buried-data, the following estimation processing is not executed and the inputted data are processed to be recorded as they are. Specifically, for example, when a data-block type of the inputted data is indicated as raw data, it is estimated that audio data without the compression processing or the like will most likely be transmitted and the audio data will probably include the buried-data descried above. When the other data-block type is indicated, the following record restriction processing according to the flow chart is made not to be executed.

When it is estimated that the format of inputted data indicates that the buried-data is probably included in audio data, an actual processing to detect the offset data from the inputted data is executed. If the offset data are detected as the result of the estimation, the buried position of the copyright information which is indicated by the offset data is estimated. Then, it is estimated whether or not the copyright information can be detected from the corresponding data in stored data in the buffer memory 163 (step S13). When no copyright information can be detected by this processing, the processing is repeated until the copyright information is detected. If the copyright information has been detected, content of the copyright information is checked (step S14). In checking the contents, it is estimated by the copy-limitation yes/no information (see FIG. 4) included in the copyright information whether the copying is limited or not (step S15).

When it is estimated in this step that there is no copy-limitation, the controller 171 starts processing to record data stored in the buffer memory 163 on the disk 101 installed in the disk-drive apparatus 100. Thus, the data are recorded on the disk 101 (step S16). Even after the data recording has been started, each time new data for a fixed time period are buffered in the buffer memory 163, the processing returns to the step S12 for detecting the offset data regularly.

When it is detected at the step S15 that there is the copy-limitation, the number of times of copying permitted is estimated (step S18) from the copy-control information (see FIG. 4) in the copyright information. In this example, since there is the copy-limitation that the copying is permitted only once, it is estimated whether the number of times of copying permitted is once or not. If the number of times of copying permitted is estimated not to be once (namely, the number of times of copying permitted is null time), the controller 171 controls to stop recording at that time for inhibiting the apparatus from recording the inputted data on the disk 101 (step S19). Moreover, after the recording has already been started, if the copy-control information indicative of null time as the number of times of copying permitted is detected at this step, then the recording at that time is also stopped.

Furthermore, when it is estimated that the number of times of copying permitted is once at the step S18, a renewal processing to rewrite contents of the buried-data including the copyright information, which is contained in data stored in the buffer memory 163, is executed (step S20). The renewal processing in this case is to revise contents so that the copyright information may be indicative of null time as the number of times of copying permitted. The revision processing will be described later in detail.

In this way, data stored in the buffer memory 163 are rewritten and copyright information is revised thereby. The thus revised data are read out of the buffer memory 163 and the record processing is executed under the control of the controller 171 to record the data on the disk 101 (step S21).

Moreover, when the offset data cannot be detected at the step S12 from the certain amount of data which is stored in the buffer memory 163, it is also estimated that the data does not include the buried-data. Then, the processing moves to the step S16 for starting the record processing of inputted data. However, if the copyright information is detected by processings at the steps S12 and S13 from the buffered data at the later step S17, the recording will be stopped when the step S19 is reached based on conditions of the detection at that time.

Figure 6:
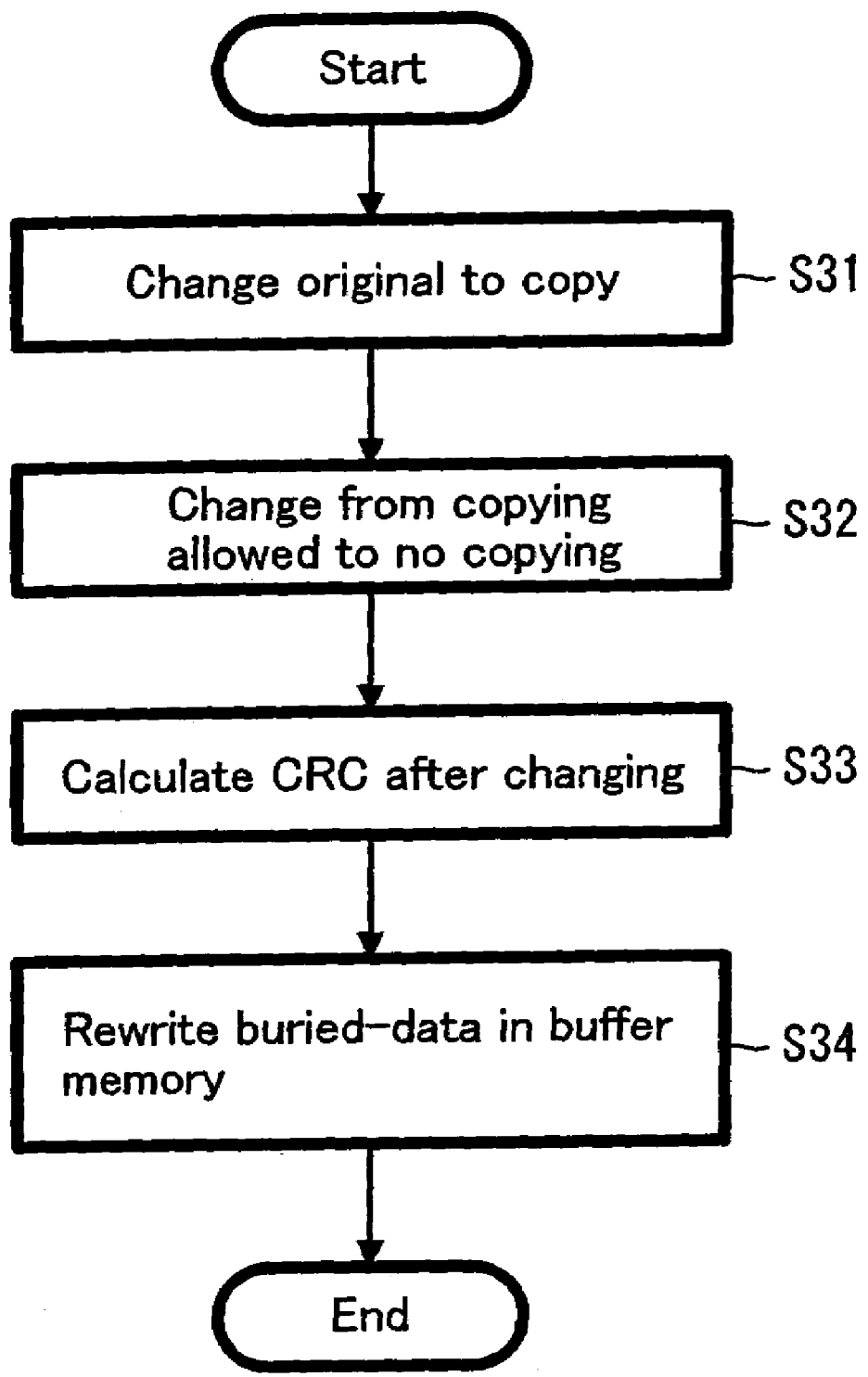
FIG. 6 is a flow chart showing the contents renewal processing of copyright information according to an embodiment of the present invention.

Next, the revision processing of copyright information at the step S20 in the flow chart of FIG. 5 will be described with reference to a flow chart of FIG. 6. As already has described, the revision processing of copyright information is executed by rewriting data stored in the buffer memory 163 under the control of the controller 171, so that the controller 171 estimates and processes first on data to be rewritten. Specifically, when the copy/original information shown in FIG. 4 is original information, it is changed to copy (step S31). Further, the copy-control information is changed from once to null time in the number of times that copying is permitted (step S32). After having processed so far, the controller 171 calculates the cyclic redundancy code (CRC) for new copyright information having the revised copy/original information and the revised copy-control information (step S33).

Having processed heretofore, the controller 171 actually makes the apparatus rewrite data for which the controller 171 estimates that rewriting is necessary. To be specific, the controller 171 makes the apparatus rewrite the relevant buried-data stored in the buffer memory 163 to the buried-data of a new data structure which is estimated by the controller 171 (step S34). This rewriting is continued as long as audio data of music (track) at that time continue to be inputted and recorded. However, if the inputted data have not included the buried-data, the rewrite processing is then suspended (the recording is continued.).

Additionally, in order to bury precisely the buried-data in audio data, it is necessary to somewhat modify the audio data so that the buried-data buried at that time may make no effect on reproduced sound of the audio data. In case of this example, only a few bits within the buried-data buried in each sector are modified and so it is difficult for a listener to catch a change of reproduced sound due to the modification. Therefore, no modification of audio data is carried out. However, when the controller 171, etc. can calculate to modify audio data, the modification of audio data accompanying the revision of the buried-data can be carried out.

By recording audio data whose buried-data has thus been revised on the disk 101 mounted on the disk-drive apparatus 100, when reproducing the recorded data from the disk 101, the buried-data included in the reproduced data serves as data indicating correct copy-limitation, thereby allowing the copyright management processing by the copyright information to be executed correctly. In case of this example, while data to be recorded are stored in the buffer memory 163 which the disk-drive apparatus 100 comprises for processing data, the buried-data is detected by estimating the stored data and the buried-data is revised by rewriting while it is stored in the buffer memory 163. As a result, there is no need for special circuits to estimate the buried-data and perform the rewriting, thus enabling the structure and operation of the disk-drive apparatus to be made simpler accordingly.

Moreover, because the buried-data is processed under the control of the controller 171 without the necessity for providing exclusive circuits to process the buried-data, when the format, etc. of the buried-data is changed for example, it is possible to cope therewith only by revising control data through the controller 171. Thus, it is possible to cope easily with the change of format.

Figure 7:
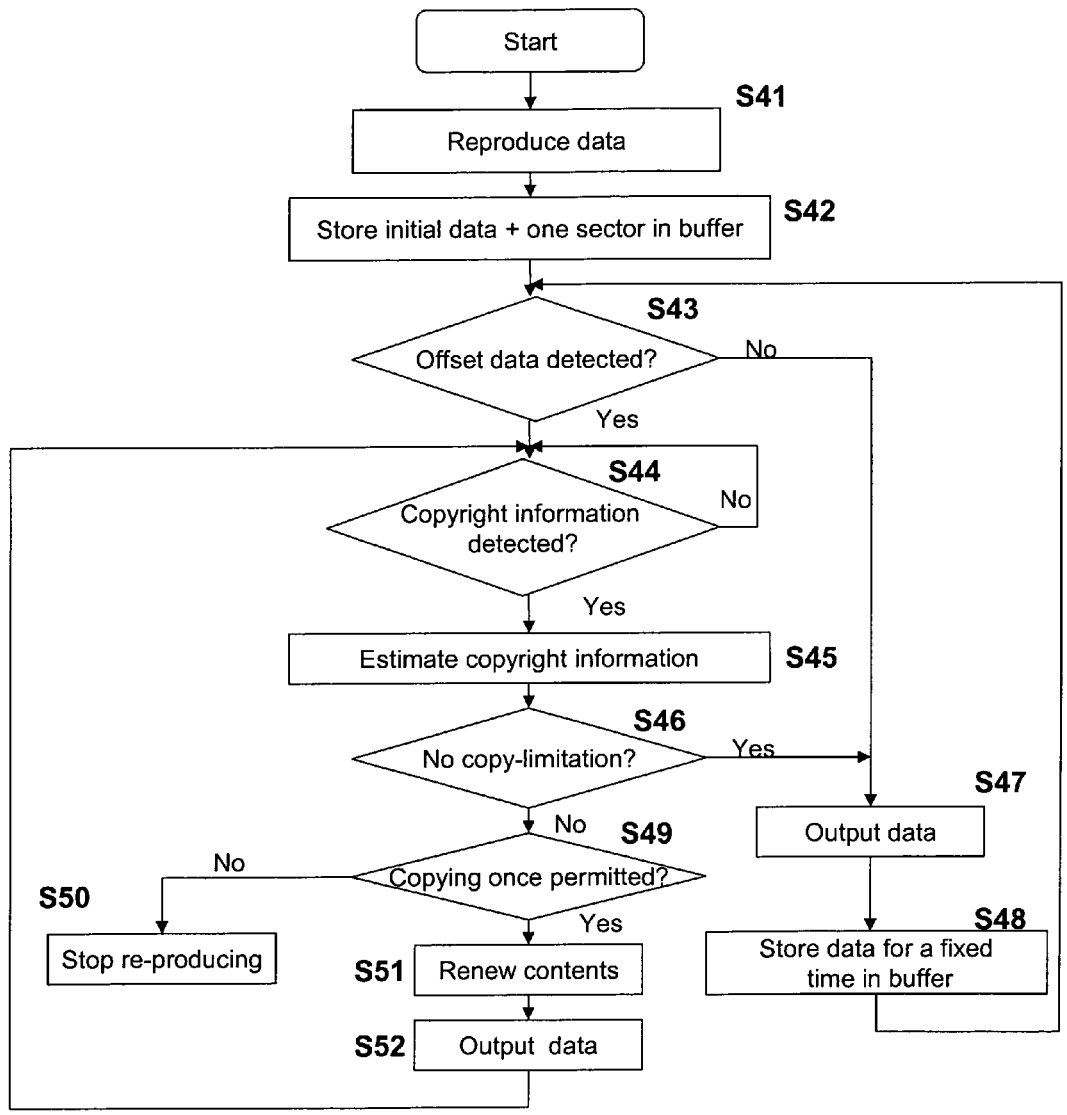
FIG. 7 is a flow chart showing the reproduction processing according to an embodiment of the present invention.

In addition, although it has been described so far that the buried-data is revised in recording, the disk-drive apparatus 100 can detect and revise the buried-data as well, when reproducing data from the disk 101 mounted thereon. A flow chart of FIG. 7 shows a control example by the controller 171 when the buried-data is revised in reproduction. An example of processing in reproduction will now be described below with reference to the flow chart. To start with, data recorded on the disk 101 are reproduced (step S41). The reproduced data supplied to the decode/encode block 160 are made to be stored in the buffer memory 163 up to a necessary amount of data (step S42). At this moment, in the same way as in the record processing shown in the flow chart of FIG. 5, the initial data which are required for estimation of the buried-data plus data for one sector are made to be stored in the buffer memory 163.

When the predefined amount of reproduced data has been stored in the buffer memory 163, the controller 171 detects the data stored in the buffer memory 163 and estimates whether or not the offset data can be detected from the stored data (step S43).

At this time, the format of reproduced data is estimated first from subcode, etc. incidental to the reproduced data. In other words, it is estimated whether or not the format indicates that the audio data probably include the buried-data. When it is estimated that the format of inputted data does not indicate that the audio data probably include the buried-data, the subsequent estimation processings are not executed and the reproduced data stored in the buffer memory 163 are processed by the decode/encode block 160 before outputted from the external interface 173 to the outside (In the example of FIG. 1, the host computer 200). Specifically, for example, when a data-block type of the reproduced data is indicated as raw data, it is estimated that the audio data probably have the buried-data. When the other data-block type is indicated, the subsequent record restriction processing according to the flow chart is made not to be executed.

Then, when it is estimated that the format of reproduced data indicates that the buried-data is probably included in the audio data, the processing to detect the offset data from the reproduced data is actually executed. If the offset data are detected as the result of that estimation, the buried position of the copyright information indicated by the offset data is estimated. Then, it is estimated whether or not the copyright information can be detected from the corresponding data of stored data in the buffer memory 163 (step S44). When no copyright information can be detected by this processing, the processing is repeated until the copyright information is detected. If the copyright information has been detected, content of the copyright information is checked (step S45). In checking the contents, it is estimated from the copy-limitation yes/no information (see FIG. 4) included in the copyright information whether the copying is limited or not (step S46).

When it is estimated at this step that there is no copy-limitation, the reproduced data stored in the buffer memory 163 are processed by the decode/encode block 160 before outputted from the external interface 173 to the outside (In the example of FIG. 1, the host computer 200) (step S47).

Even after the outputting of reproduced data has been started, each time new data for a fixed time period are buffered in the buffer memory 163, the processing returns to the step S43 for detecting the offset data regularly.

When it is detected at the step S46 that there is the copy-limitation, the number of times of copying to be permitted is estimated (step S49) from the copy-control information (see FIG. 4) in the copyright information. In case of this example, there is the copy-limitation and the copying is permitted only once, so that it is estimated whether the number of times of copying permitted is once or not. If the number of times of copying permitted is estimated not to be once (that is, the number of times of copying permitted is null time), the controller 171 controls to stop reproducing at that time, thus making the data stored in the buffer memory 163 not to be outputted from the external interface 173 to the outside of the disk-drive apparatus 100 (step S50). Moreover, after the outputting of reproduced data has already been started, if the copy-control information indicative of null time as the number of times of copying permitted is detected at this step, then the reproduction at that time is also stopped.

Further, when it is estimated at the step S49 that the copying is permitted once, a renewal processing which rewrites contents of the buried-data including the copyright information, which is contained in data stored in the buffer memory 163, is executed (step S51). The renewal processing in this case is to revise the contents so that the copyright information may be indicative of null time as the number of times of copying permitted. The revision processing is the same processing as in the recording which has already been described with reference to the flow chart of FIG. 6.

In this way, data stored in the buffer memory 163 are rewritten and the copyright information is revised thereby. The thus revised data are read out of the buffer memory 163 and processed by the decode/encode block 160 if necessary under the control of the controller 171 before outputted from the external interface 173 to the outside (host computer 200). Thereafter, the reproduction from the disk and the outputting of reproduced data are continued (step S52). However, after the outputting of reproduced data has been started at the step S52, the processing is returned to the step S44 for estimating at any time if the copyright information is processed appropriately. When it is estimated at the step S49 that the copying is not permitted, the outputting of reproduced data is stopped.

Furthermore, when no offset data can be detected at the step S43 from a certain amount of data stored in the buffer memory 163, the data are estimated as including no buried-data and the processing is moved to the step S47 for making the output processing of reproduced data to be started. However, if the copyright information is detected by processings at the steps S43 and S44 from data buffered at the later step S48, the outputting of reproduced data is then stopped when the step S50 is reached on detected conditions at that time.

By processing in this manner during reproduction, it is also possible to prevent effectively wrong copying, etc. of data reproduced from a disk based on the copyright management information buried in data recorded on the disk. In this case, similarly to processings in the recording, all needed for execution are the estimation of data stored in the buffer memory 163 by the controller 171 and the rewriting of data stored in the buffer memory 163. Therefore, there is no need for special circuits which process to detect and rewrite the buried-data, thereby enabling the buried-data management in reproduction to be performed with simpler structure and processing accordingly.

Additionally, in the description referring to the flow chart of FIG. 7, it is simply controlled whether the outputting of reproduced data is restricted or not. However, depending on conditions of the reproduced data being outputted at that time, the processing based on the flow chart of FIG. 7 can be executed. For example, when the disk-drive apparatus 100 is connected to an equipment such as the host computer 200, as shown in FIG. 1, in which the reproduced data will most likely be recorded in digital form as they are, the outputting of reproduced data to the connected equipment can be restricted as shown in the flow chart of FIG. 7. At the same time, for example, when the reproduced audio data are converted into analog form and outputted as an analog audio signal, it is possible not to restrict outputting from the output terminal no matter what kind of buried-data is detected.

Moreover, although the controller 171 in the disk-drive apparatus 100 estimates for restricting the recording and reproduction in the above-mentioned embodiment, the disk-drive apparatus 100 can perform recording data supplied from the host computer 200 on the disk 101 and outputting data reproduced from the disk 101 to the host computer 200 based on instructions from the host computer 200, while a control means in the host computer 200 estimates similarly the buried-data in data to be recorded or in reproduced data stored in a memory functioning as a buffer memory within the host computer 200, for causing the host computer 200 to restrict the recording and to restrict the outputting of reproduced data.

Furthermore, although the predetermined amount of initial data is first stored in the buffer memory to detect the buried-data from inputted data (or reproduced data) in the above-mentioned embodiment, if the inputted data are audio data for example, it is possible to make the controller estimate a signal level of the audio data and buffer the inputted data in the buffer memory as the initial data until the signal level of audio data reaches a certain level that the buried-data is certainly included.

In addition, although the detection and rewriting of data are performed using the buffer memory 163 connected to the decode/encode block 160 in the aforementioned embodiment, the detection and rewriting of data can be performed using the other buffer memory included in a circuit of the recording system or reproducing system.

Although the record processing and reproduction processing based on the buried-data buried in audio data have been described with the above-described embodiment, it is of course possible to detect data which are directly buried in other various contents data to control recording in various media or reproducing from those media.

INDUSTRIAL APPLICABILITY

According to the recording method and recording apparatus of the present invention, for example, when copy-limiting information is included in additional information buried in inputted contents data, processing to restrict recording the contents data in a medium is executed based on the additional information, in which data stored in the buffer means that temporarily stores data to be recorded are estimated. Therefore, a satisfactory processing to restrict recording will be executed and a copyright protection processing such as prevention of wrong copying can easily be accomplished.

Moreover, according to the reproducing method and reproducing apparatus of the present invention, for example, when copy-limiting information is included in additional information buried in contents data reproduced from a medium, processing to restrict outputting the contents data is executed based on the additional information, that is, outputted contents data are restricted from being recorded in the other medium. By estimating data stored in the buffer means temporarily storing reproduced data, a satisfactory processing to restrict outputting the reproduced data will be executed, so that a copyright protection processing such as prevention of wrong copying in which the reproduced data are recorded by the other recording apparatus can easily be attained.

The invention claimed is:

1. A recording method comprising:
   a storage step of making buffer means store temporarily a predetermined amount of inputted contents data;
   a kind identification step of identifying the kind of data on said imputed contents data;
   a detection step of detecting additional information buried in said contents data from said contents data temporarily stored in said storage step;
   an estimation step of estimating contents of said additional information detected in said detection step; and
   a recording step of recording said contents data in a predetermined medium when estimated that said contents data can be recorded in said estimation step and of stopping recording said contents data in the medium when estimated that said contents data must not be recorded in said estimation steps,
   wherein only when said contents data are identified as data of a predetermined format in said kind identification step, said detection step and estimation step are executed for restricting the recording in the medium.

2. The recording method according to claim 1, further comprising
   a rewriting step of rewriting said additional information stored in said buffer means while said additional information is being stored in said buffer means, when estimated in said estimation step that it is necessary to rewrite said additional information.

3. The recording method according to claim 1, wherein said predetermined format to be identified in said kind identification step is a format indicative of audio data.

4. The recording method according to claim 1, wherein when said contents data start to be inputted, if a predetermined amount or more of said contents data has been stored in said buffer means in said storage step, detection in said detection step is started.

5. A recording apparatus comprising:
   buffer means for storing temporarily a predetermined amount of inputted contents data;
   control means for detecting additional information buried in said contents data from said contents data temporarily stored in said buffer means, for making said contents data to be recorded when contents of the detected additional information indicate that said contents data can be recorded, and for stopping said contents data from being recorded when said contents indicate that said contents data must not be recorded; and
   recorder means for recording said contents data in a predetermined medium under the control of said control means,
   wherein said control means identifies the kind of data on said contents data temporarily stored in said buffer means, and controls to permit said contents data to be recorded in said medium or to inhibit said contents data from being recorded only when the kind of data identified is indicative of a predetermined format of data.

6. The recording apparatus according to claim 5, wherein said control means, when estimating that said additional information must be rewritten, controls to rewrite said additional information stored in said buffer means while said additional information is being stored in said buffer means.

7. The recording apparatus according to claim 5, wherein after said buffer means has stored a predetermined amount of data or over, said control means starts detecting said additional information.

8. A reproducing method comprising:
a storage step of making buffer means store temporarily a predetermined amount of contents data reproduced from a predetermined medium;
a kind identification step of identifying the kind of data on said contents data stored in said storage step;
a detection step of detecting additional information buried in said contents data from said contents data temporarily stored in said storage step;
an estimation step of estimating contents of said additional information detected in said detection step; and
an outputting step of outputting said contents data temporarily stored in said buffer means to the outside, when estimated that said contents data can be copied in said estimation step, and of not outputting said contents data temporarily stored in said buffer means to the outside, when estimated that said contents data must not be copied,
wherein only when said contents data are identified as data of a predetermined format in said kind identification step, said detection step and estimation step are executed for restricting the outputting of reproduced data.

9. The reproducing method according to claim 8, further comprising
a rewriting step of rewriting said additional information stored in said buffer means while said additional information is being stored in said buffer means, when estimated in said estimation step that it is necessary to rewrite said additional information.

10. The reproducing method according to claim 8, wherein
said predetermined format to be identified in said identification step is a format indicative of audio data.

11. The reproducing method according to claim 8, wherein when said contents data start to be reproduced, if a predetermined amount or more of said contents data has been stored in said buffer means in said storage step, detection in said detection step is started.

12. The reproducing method according to claim 8, further comprising
an indication step of indicating a result estimated in said estimation step in a predetermined manner.

13. A reproducing apparatus comprising:
reproduction means for reproducing contents data from a predetermined medium;
buffer means for storing temporarily a predetermined amount of said contents data reproduced by said reproduction means;
output means for outputting said contents data temporarily stored in said buffer means; and
control means for detecting additional information buried in said contents data from said contents data temporarily stored in said buffer means, for making said contents data outputted from said output means when the detected additional information indicates that said contents data can be copied, and for making said contents data not outputted from said output means when it is indicated that said contents data must not be copied,
wherein said control means identifies the kind of data on said contents data temporarily stored in said buffer means, and controls to make said contents data not outputted from said output means only when said contents data are identified as data of a predetermined format.

14. The reproducing apparatus according to claim 13, wherein
said control means, when estimating that said additional information of said contents data outputted from said output means must be rewritten, controls to rewrite said additional information stored in said buffer means while said additional information is being stored in said buffer means.

15. The reproducing apparatus according to claim 13, wherein
after said buffer means has stored a predetermined amount of data or more, said control means starts detecting said additional information.

16. The reproducing apparatus according to claim 13, further comprising
indication means for indicating contents instructed by said additional information detected by said control means.

* * * * *